Sept. 19, 1961 R. S. HALL 3,000,183
SPIRAL ANNULAR COMBUSTION CHAMBER
Filed Jan. 30, 1957 4 Sheets-Sheet 1

INVENTOR.
Russell S. Hall
BY Paul Fitzpatrick
ATTORNEY

Sept. 19, 1961 R. S. HALL 3,000,183
SPIRAL ANNULAR COMBUSTION CHAMBER
Filed Jan. 30, 1957 4 Sheets-Sheet 2

INVENTOR.
Russell S. Hall
BY Paul Fitzpatrick
ATTORNEY

Sept. 19, 1961 R. S. HALL 3,000,183
SPIRAL ANNULAR COMBUSTION CHAMBER
Filed Jan. 30, 1957 4 Sheets-Sheet 3
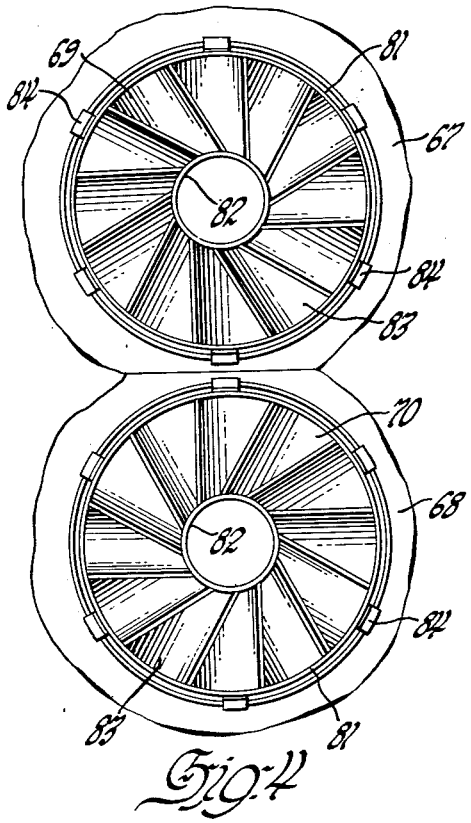
INVENTOR.
Russell S. Hall
BY
Paul Fitzpatrick
ATTORNEY Sept. 19, 1961 R. S. HALL 3,000,183
SPIRAL ANNULAR COMBUSTION CHAMBER
Filed Jan. 30, 1957 4 Sheets-Sheet 4
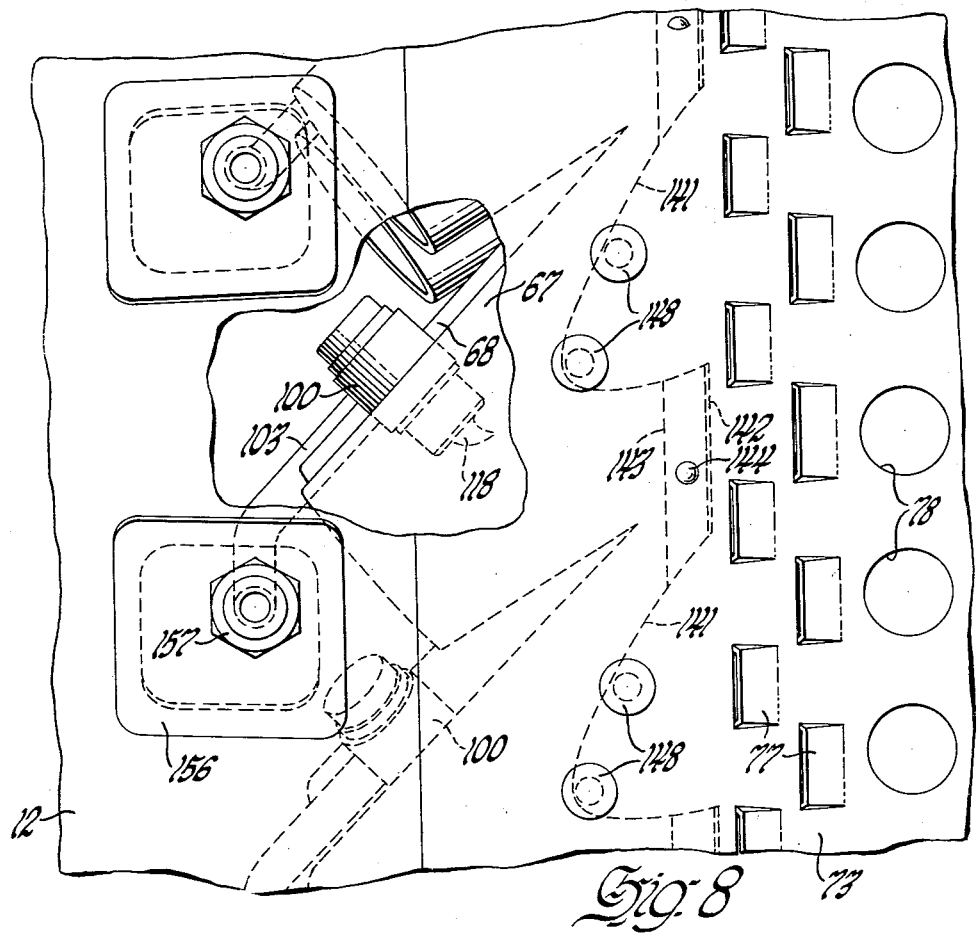
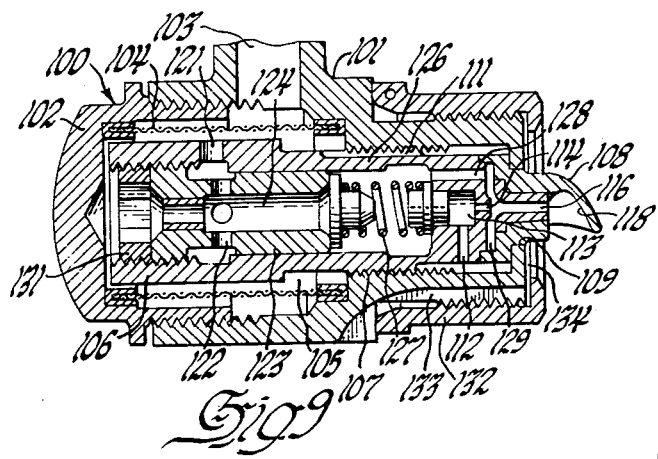
INVENTOR.
Russell S. Hall
BY
Paul Fitzpatrick
ATTORNEY

United States Patent Office 3,000,183
Patented Sept. 19, 1961

3,000,183
SPIRAL ANNULAR COMBUSTION CHAMBER
Russell S. Hall, Indianapolis, Ind., assignor to General Motors Corporation, Detroit, Mich., a corporation of Delaware
Filed Jan. 30, 1957, Ser. No. 637,314
10 Claims. (Cl. 60—39.65)

My invention relates to combustion chambers for gas turbine engines. The principal purpose of the invention is to improve such engines, particularly aircraft jet engines, by providing an improved combustion chamber incorporating the advantages of both annular and can type combustion apparatus. The purpose of the invention may be otherwise stated as to improve the structure and performance of such engines by providing a shorter combustion chamber, increasing altitude flexibility of the engine, reducing the pressure losses in the combustion apparatus and maintaining uniform temperature patterns in the combustion chamber discharge.

The merits of the preferred embodiment of the invention stem from a number of cooperating factors. One is the development of a skewed or partly circumferential flow pattern in the combustion chamber which provides adequate length of the air path through the chamber while permitting shorter overall length.

Another factor is the development of controlled vortices which interfere to a sufficient extent to set up the necessary degree of small scale turbulence in the apparatus to insure adequate mixing and complete combustion.

A third factor is the echelon or staggered overlapping relations of the vortices which causes some mixing of combustion products with unburned fuel and air mixture for heating the latter and furthering the vaporization of the fuel spray.

An additional, optional, factor is the direction of the spray into the region of overlapping or interfering vortices.

By way of background, it may be mentioned that recent successful combustion apparatuses for gas turbines have been either of the full annular type, in which an annular combustion space is defined by a combustion liner mounted in an annular air duct between the compressor and turbine of the engine, or of the can type, in which a number of cylindrical flame tubes are mounted in the annular duct. The full annular type is usually lighter and tends to give lower pressure drop and more even temperature distribution. The can type has been found to perform better at high altitudes, and is much easier to test to improve its performance, since tests may be made quite satisfactorily on a single can. It appears that it is more feasible to maintain a suitable degree of turbulence and a greater flame intensity in a can than in the full annulus.

The combustion structure of the present invention involves a new relation of elements and a new structure to make available the advantages of both types and, in addition, by virtue of the partly circumferential flow pattern, to reduce considerably the overall length of the combustion apparatus.

The nature of the invention and the advantages thereof will be clearly apparent to those skilled in the art from the succeeding detailed description of preferred embodiments of the invention and the accompanying drawings, in which:

FIGURE 4 is a detail view of the swirlers in the combustion chamber inlets of FIGURE 2.

FIGURE 5 is a diagrammatic developed sectional view, taken on a cylindrical plane, showing the staggered arrangement of combustion chamber inlets and the operating zones of the combustion chamber.

FIGURE 6 is a diagram illustrating one type of vortex relation.

FIGURE 7 is a diagram illustrating a second type of vortex relation.

FIGURE 8 is a view similar to FIGURE 2 showing a second form of combustion chamber having a fuel nozzle installation as shown in FIGURE 3.

FIGURE 9 is a longitudinal sectional view of the fuel nozzle of FIGURES 3 and 8.

FIGURE 1 illustrates not only the combustion chamber, but also the outlet portion of the compressor and the turbine inlet. The engine, apart from the combustion apparatus, may be of known type.

Figure 1:
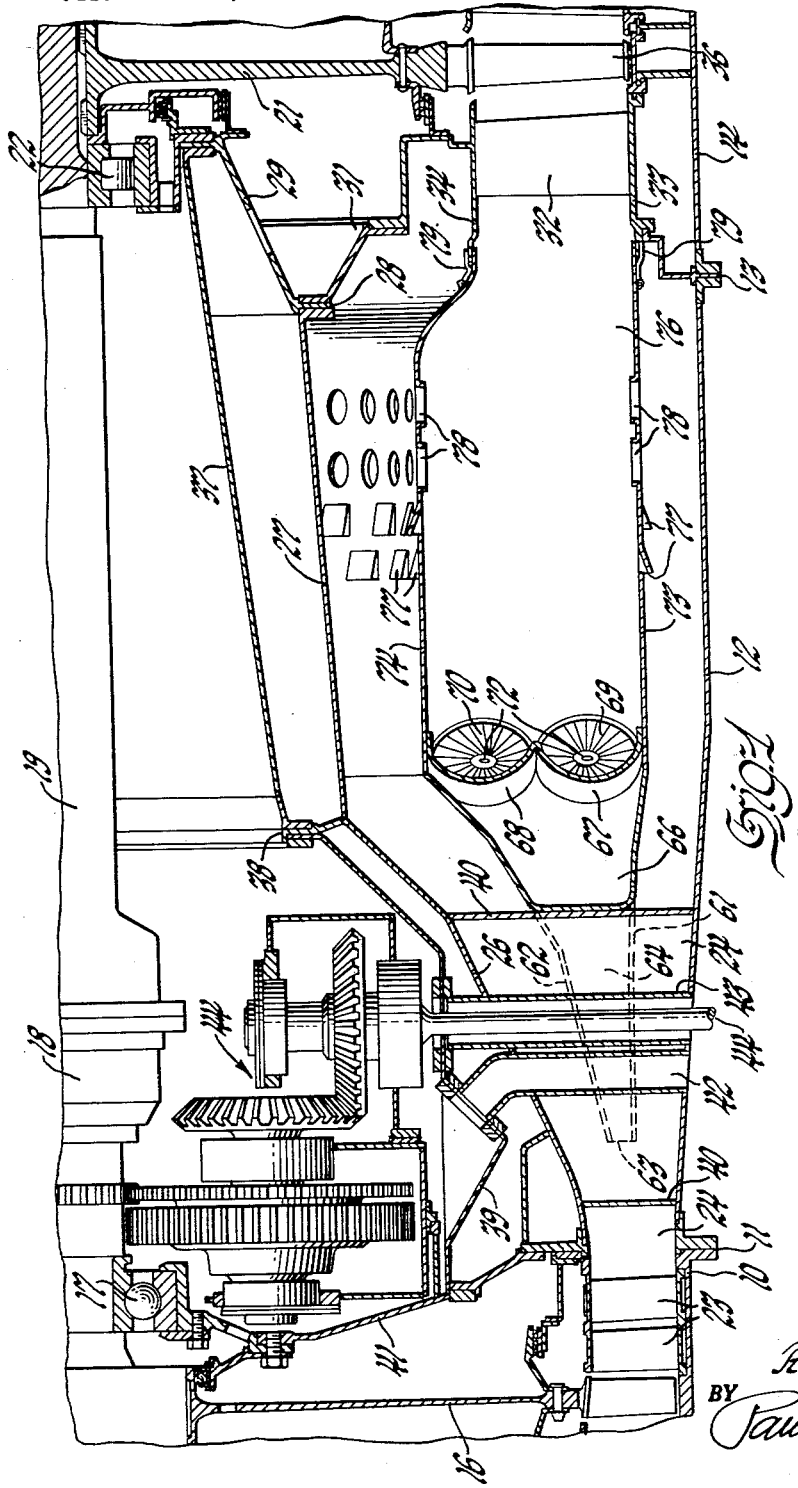
FIGURE 1 is a partial longitudinal section of a turbojet engine taken on a plane containing the axis of the engine.

The compressor case 10 is bolted at flanges 11 to the outer case 12 of the combustion chamber, which bolts at flanges 13 to an outer case 14 of the turbine. The compressor includes a number of rotor disks, of which only the final disk 16 is illustrated. The compressor rotor is supported in a ball thrust bearing 17 and a forward bearing (not shown) and is coupled at 18 to the turbine shaft 19 on which is mounted the first turbine wheel 21 and subsequent turbine wheels. The turbine shaft is mounted in a roller bearing 22. The compressor discharges through straightening vanes 23 into a diffusing passage 24 defined by the case 12 and a converging inner shroud 26. This shroud is integral with a continuing wall or shroud 27. Wall 27 bolts at flanges 28 to a turbine bearing support 29 and a turbine nozzle support 31. A first stage turbine nozzle comprises vanes 32 extending between an outer shroud 33 supported within the turbine case 14 and an inner shroud 34 mounted on the nozzle support 31. The nozzle vanes 32 direct the motive fluid onto blades 36 of the first stage turbine wheel. A shaft housing or oil sump is provided by a conical member 37 mounted between the turbine bearing support and a flange 38 extending inwardly from the inner combustion chamber wall. The forward portion of the sump is provided by a sheet metal housing 39 mounted between the flange 38 and the support 41 for the compressor rear bearing 17. Hollow struts 40 extend across the diffuser between the outer and inner walls.

An oil drain tube 42 and a housing 43 for an accessory drive shaft 44 extend radially of the engine through a strut 40 between the diffuser walls 26 and 12. Gearing indicated generally at 44 provides a drive for the shaft 44 from the shaft 17. As will be apparent, the outer wall 12 and the inner wall defined by the parts 26, 27 and 31 define an annular duct through which air is conveyed from the compressor outlet to the turbine inlet and within which is mounted the combustion chamber structure of the invention.

It is to be understood that the details of the engine so far as they have been described are material to the invention only in that they show the environment and that further details of the engine are omitted as irrelevant.

Proceeding now to a description of the structure of the combustion liner or combustion chamber, this comprises outer and inner annular plates 61 and 62 which diverge in the direction of flow and are mounted in the diffuser section of the duct between the forward portion of wall 12 and wall 26. Plates 61 and 62 define a flow divider and a diffusing passage for the primary or combustion air supplied to the combustion chamber. Air enters this diffuser through a forward opening 63. Saddles 64 may be provided in the diffuser entrance to fit around the radial struts 40. The primary air, after passing through the diffusing passage 66 between the walls 61 and 62, is admitted to the combustion portion of the liner through an outer row of air inlets or entrance cones 67 and an inner row of air inlets or entrance cones 68. These inlets are paired, with an outer inlet radially outward of each inner inlet. Primary air swirlers 69 and 70 are mounted in inlets 67 and 68, respectively. Fuel nozzles 72 may be mounted in the centers of the inlets. The combustion is initiated in the cones but occurs principally between an outer annular wall 73 and an inner annular wall 74 which extend from the entrance portion of the combustion chamber to its outlet 76 into the turbine nozzle. Raised flaps, louvers, or cooling slots 77 are provided in the wallls to admit film cooling air for the walls and a number of inlets 78 are provided in both walls for secondary or cooling air which enters the combustion chamber radially from the air duct and mixes with the combustion products to cool them before they enter the turbine.

The discharge end of the combustion chamber converges radially to fit the turbine nozzle shrouds 33 and 34 into which it pilots. Clips 79 may be welded to the combustion chamber outlet to fit over the nozzle shrouds and assist in the location and support of the combustion chamber. The chamber may be supported at the forward end by the fuel nozzles, and additional suitable supports may be provided if desired.

FIGURE 5 is a somewhat diagrammatic view illustrating the relation of the air inlets of the combustion chamber. The figure may be considered to be a developed view of a cylindrical section through the axes of the outer row of inlets 67, looking toward the axis of the engine. The cones are skewed and mounted in echelon with the axis of the cones at an angle Q to the axis of the engine. A swirler 69 is mounted in each outer inlet, these swirlers being shown in elevation in Figure 4. Each swirler comprises an outer ring or rim 81, an inner ring 82, and helical vanes 83 extending between the rings 81 and 82. Clips 84 welded to the ring 81 may be welded to the outer surface of the inlets 67 and 68 to retain the swirlers. It should be noted that the swirlers 70 are oppositely pitched to the swirlers 69. Air entering through the swirlers is caused to adopt a vortical or swirling path through the cones or inlets 67 and 68.

These vortices are illustrated diagrammatically in FIGURE 6, in which 67a and 67b represent the vortices in adjacent outer cones 67, and 68a and 68b represent the vortex circulation in the companion inner cones 68. Because of the opposite direction of rotation, there is no significant interference between vortices 67a and 68a or between 67b and 68b. There is merely some flattening of the vortices at the plane at which they meet, indicated by 87' and 87". However, the vortices from adjacent inlets in either the inner or outer row interfere, since they are rotating in the same direction. Thus, as indicated at 88' and 88" in FIGURE 6, there is a region of small scale turbulence caused by friction or interference between the oppositely moving vortex streams. The results of this interference are the generation of a certain amount of small scale turbulence and intermingling or mixing of the streams of air or gas between vortices 67a and 67b and between 68a and 68b. Because of the staggered or skewed arrangement of the inlets, the zone of interference is farther downstream in one set of vortices than in the other, as indicated generally by the relative sizes of the vortices in FIGURE 6.

Referring again to FIGURE 5, the zone 90 of the inlet ahead of the intersection of the inlet with the adjacent cone upstream of it (ahead of broken line 91) may be termed the mixing zone. The zone 92 in the inlet between the mixing zone and the point at which the cone intersects the cone on the downstream side may be termed the preliminary combustion zone (terminated at the broken line 93). The zone beyond the line 93 of each inlet, between the walls 73 and 74, provides for completion of combustion and addition of secondary air. Fuel is introduced into the mixing zone, where it mixes with the swirling air and combustion takes place in the preliminary combustion zone and further downstream in the chamber. Since the vortex in the preliminary combustion zone 92 of each inlet is in contact with the vortex, farther downstream, of the combustion zone of the adjacent inlet on one side, the transfer of combustion products to the one vortex from the hotter or more completely burned mixture in the adjacent vortex furthers the vaporization of the fuel and its combustion. Thus, each pair of inlets acts to promote and stabilize combustion in the adjacent vortex in the direction downstream, or upward in FIGURE 5.

Figure 2:
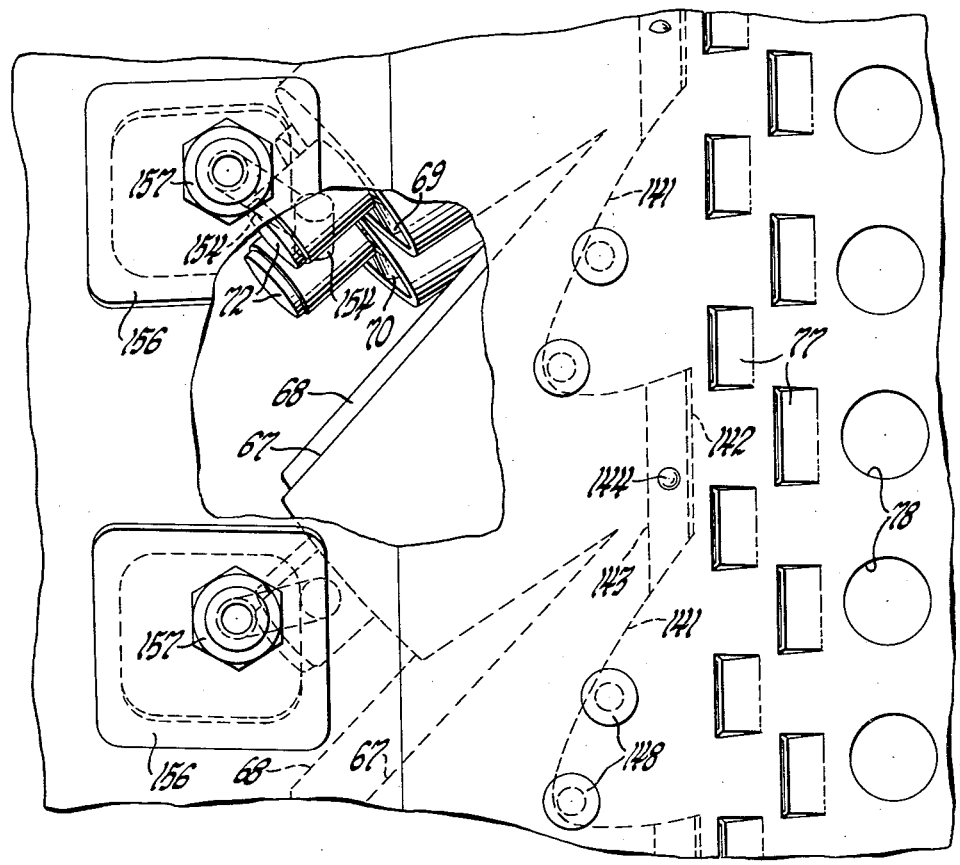
FIGURE 2 is a partial elevation view of one form of combustion chamber with parts broken away.

FIGURE 2 shows a combustion chamber with fuel nozzles 72 such, for example, as those shown in United States Patent No. 2,751,273, having a conical spray pattern, mounted in the centers of the swirlers 69 and 70. The inner nozzle 72 is connected by a hollow strut or pipe to the outer nozzle 72. The fuel supply tube or inlet pipe 154 for both nozzles extends outwardly from the outer nozzle through an opening in plate 61 and is fixed to a mounting plate 156 which may be fixed to the outer wall 12 of the engine by studs or cap screws (not shown). A fitting 157 on the end of the tube 154 which projects through the plate provides for connection to a fuel manifold.

The generally parabolic lines 141 represent the junction of the outer cone 67 with the outer wall 73. The louvers 77 for film cooling air and the first row of dilution air holes 78 are also shown in the figure. Cusp-shaped filler plates 142 close the gaps between the discharge ends of the cones and the outer and inner wallls 73 and 74. These filler plates may have flanges 143 secured to the annular walls by rivets 144. The arcuate sections 141 at the end of the cones may be secured to the outer and inner wall by clips welded to the walls of the cones and fixed to headed plugs 148 extending through the annular walls 73 and 74.

Figure 3:
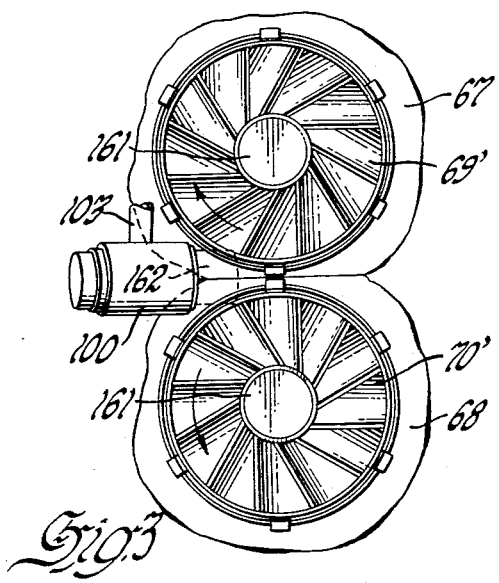
FIGURE 3 is a fragmentary sectional view illustrating the fuel nozzle installation of a second form of combustion chamber.

FIGURE 8 illustrates a structure which may be generally the same as that previously described except for the fuel introduction arrangement. In other words, the inner and outer annular walls and the entrance cones may be the same as those previously described. In this structure, fuel is sprayed in a generally flat or fan-shaped pattern by a nozzle projecting into the side of the inlet cones at their junction; that is, mounted in a plane radially intermediate the centers of the outer and inner swirlers. Referring to FIGURES 3 and 8, the combustion chamber parts previously described are identified by the same numbers as in FIGURES 1 and 2. The fuel nozzles 100 project into the sides of the inlet cone slightly downstream of the swirlers 69' and 70'. These swirlers may be the same as those previously described with reference to FIGURE 4 except that the direction of rotation is as indicated by the arrows in FIGURE 3, and the centers of the swirlers are closed by disks 161. The nozzle projects through an opening 162 in the inlet cone structure.

The fuel spray is projected into the rotating vortex flows at one side of the pair of inlets. The fuel spray is mixed with the air and carried circumferentially around the inlet cone by the vortex air flows, which are moving away from the nozzle at the side of the cones in which the nozzle is mounted. The spray pattern is developed by projecting a jet of fuel under considerable pressure against a deflector plate, preferably by a nozzle structure such as that illustrated in FIGURE 9.

It will be apparent that the nozzle structure in FIGURE 9 is in some respects, particularly the structural arrangements of the parts, similar to known fuel nozzles. The nozzle, however, omits the usual swirling of the fuel to produce a conical spray, and instead directs a fuel stream against a deflector or spatter plate. The nozzle 100 comprises a body 101 closed by a cap 102. Fuel is introduced to the nozzle body through a pipe 103 which serves as a support for the nozzle body and passes through a cylindrical filter 104 into a chamber 105 between the filter and a valve body 106. The valve body is threaded into the nozzle body at 107 and retains a nozzle tip 108, which is fitted into an opening 109 in the body, against the forward wall of the nozzle body. The fuel flows through passages 111 defined by longitudinal grooves in the valve body and through radial passages 112 into chamber 113 from which it flows through an orifice 114. At small rates of fuel flow, fuel is directed only through orifice 114, from which it flows through the orifice 116 and nozzle tip in a solid jet which impinges on the more or less spoon-shaped inner surface of deflector 118 of the nozzle tip. Fuel striking this plate is atomized by the impact and is discharged in a fan-shaped or semi-conical spray, depending on the shape of the surface of the deflector 118, the particles of fuel being projected generally at right angles to the axis of the nozzle body. The nozzle is oriented so the mean spray plane is approximately radial to the engine center line.

Fuel may also flow through ports 121 in the valve body and ports 122 in a valve seat member 123 threaded into the valve body and through passage 124 in the valve seat member. When the fuel flow becomes great enough that pressure drop in the orifice 114 reaches sufficient value, a movable valve member 126 is lifted from the seat member 123 against the resistance of compression spring 127. This allows fuel to flow through passages 128 in the valve body into the space 129 behind the nozzle tip, from which it flows through the orifice 116, in addition to the fuel flowing from the orifice 114. The opening pressure of the valve may be adjusted by threading the valve seat member inwardly or outwardly in the valve body 106 and it may be locked in place by lock nut 131. A shroud or cap 132 threaded over the nozzle body directs air which flows from outside the combustion liner through grooves 133 in the nozzle body over the face 134 of the nozzle body to minimize deposition of carbon. The cap 132 fits into the opening 162 in the combustion lines. The nozzle inlet pipes 103 are rigidly mounted on plates 156 and connected to fuel inlets 157 (FIG. 8).

FIGURE 7 illustrates diagrammatically a modification of the invention to provide interference between vortex flows from the inner and outer swirlers of each pair rather than between adjacent pairs of swirlers as described in connection with FIGURE 6. The structure to produce this result may be the same as that previously described with respect to FIGURES 2 and 4 or with respect to FIGURE 8, except for a reversal of the pitch of some of the swirlers. In a combustion chamber according to FIGURE 7, the inner and outer swirlers of each pair are pitched in the same direction and swirlers of adjacent pairs are reversed in direction. Thus, in this case, the clockwise vortex 167 from the outer inlet of a pair interferes with the clockwise vortex 168 from the inner inlet of the pair in a zone indicated at 169. The outer and inner vortices on each side of vortices 167 and 168 will be counterclockwise rotating, as illustrated by the vortices 171 and 172. Thus, there are zones of contact, as indicated at 173 and 174, between the circumferentially adjacent vortices without substantial interference. In such a case, however, there is interference of the mixing zones of vortices of a pair as indicated at 169 and between the combustion zones as indicated at 176. In this sort of structure, the small scale turbulence is set up as before, but the transfer of combustion products from the combustion zone of one set to the mixing zone of the adjacent set is minimized.

In the operation of the combustion chamber, in any of the forms described, the air is originally introduced at an angle to the axis of the combustion chamber indicated by the angle Q of FIGURE 5. This angle may vary, the preferred range being from about between 45 to about 65 degrees. As angle Q is increased, the overlapping of adjacent inlet groups increases, with greater interaction between the adjacent vortex groups. Since the circumferential component of flow is greater as angle Q is increased, the total length of the flow path through the combustion chamber becomes greater for a given overall length. Thus, increasing angle Q also tends to make a shorter overall or axial length of the combustion chamber possible.

As the air proceeds downstream from the inlet and is energized and expanded by the combustion of fuel, the axial component of its velocity increases without an increase in the circumferential component, so that the angle of flow of the combustion products diminishes and approaches the axial direction. Introduction of film cooling air through the slots 77 and, to a greater extent, introduction of large quantities of secondary air through the holes 78, still further reduces the angle of flow of the air with respect to the axis, since the air introduced at 77 and 78 has no circumferential velocity. The final flow through the outlet of the combustion chamber into the turbine nozzle will be nearly parallel to the engine axis.

It will be seen that the structure disclosed departs very significantly from the usual annular type of combustion chamber with flow parallel to the axis. In such chambers, the upstream portion where the flow is relatively small is usually of small axial depth compared to the outlet. In a combustion chamber according to the invention, the axial depth at the inlet is preferably nearly as great as that throughout the chamber prior to its convergence to the turbine nozzle. The greater depth near the inlet provides space for sufficient flow notwithstanding the very substantial circumferential component of the gross movement of the air. Since the primary or combustion air is only perhaps 25 percent of the total, the flow may be directed at a rather large angle, such as 65 degrees, to the axis without crowding or pressure losses. This provides a long path for mixing and combustion in a shorter combustion chamber than would be required for the same length of path where the flow is parallel to the axis.

The structures according to the invention in which small scale turbulence and mixing are fostered by the interference between adjacent vortex flows from the swirlers provides turbulence with a minimum loss of energy and provides a degree of turbulence in an annular combustion chamber which has been difficult to achieve in annular structures without wasteful pressure losses.

The inlet diffuser 66 acts as a flow divider to direct the desired proportion of compressor discharge air to the primary air inlet 67 and 68 and to diffuse this air, or, in other words, to convert its velocity energy into pressure so that uniform flow is obtained through the inlet swirlers.

The detailed description of the invention for the purpose of explaining the principles thereof is not to be considered as limiting or restricting the invention, as various modifications may be made by the exercise of skill in the art within the scope of the invention.

I claim:
1. A combustion apparatus comprising an air duct, outer and inner annular walls within the duct spaced radially and defining between the walls the downstream portion of a combustion chamber, an outer row and an inner row of entrance cones discharging into the space between the walls, the said rows being radially spaced from each other, each cone having an inlet at the upstream end thereof and a swirler in the inlet to produce vortex flow in the cone, the cones diverging in the downstream direction and being disposed at a substantial circumferential angle to the axis of the walls, the cones in each row being in echelon so that the said cones merge at zones differentially spaced from the inlets thereof, and means for injecting fuel into the cones.

2. A combustion chamber comprising outer and inner annular walls concentric with an axis, structure defining concentric radially outer and inner rows of air inlets at the upstream end of the combustion chamber including swirlers for introduction of primary combustion air, the inner row being nearer the said axis than the outer row, the air inlets being skewed to the axis of the chamber so as to introduce the air streams with substantial axial and circumferential components of velocity with respect to the said axis, the swirlers in each row being similarly pitched to impart rotation in the same direction about the axes of the swirlers to air passing therethrough so that the vortex air streams flow downstream from the swirlers interfere at areas of overlap to produce a zone of turbulence between the streams from adjacent swirlers, and the swirlers in the inner row being oppositely pitched from those in the outer row, and means for spraying fuel into the combustion chamber adjacent the inlets.

3. A combustion chamber as recited in claim 2 in which the fuel spraying means comprises a fuel spray nozzle characterized by a conical spray pattern located centrally of each swirler.

4. A combustion chamber as recited in claim 2 in which the fuel spraying means comprises fuel spray nozzles characterized by a fan-shaped spray pattern, one such spray nozzle being common to each pair of outer and inner inlets and the plane of the spray pattern of each nozzle conforming generally to a plane radial to the axis.

5. A combustion apparatus comprising an air duct, outer and inner annular walls within the duct spaced radially and defining between the walls the downstream portion of a combustion chamber, an outer row and an inner row of entrance cones discharging into the space between the walls, each cone having an inlet at the upstream end thereof and a swirler in the inlet to produce vortex flow in the cone, the cones diverging in the downstream direction and being disposed at a substantial circumferential angle to the axis of the walls, the number of cones in the two rows being equal, with an inner cone disposed radially inwardly of and merging with each outer cone, the cones in each row being in echelon so that the said cones merge at zones differentially spaced from the inlets thereof, the direction of rotation of the vortices in cones adjacent in one of the radial and circumferential directions being the same and the direction of rotation of the vortices in cones adjacent in the other of said directions being opposite, and means for injecting fuel into the cones.

6. A combustion apparatus as recited in claim 5 in which the directions of rotation of the vortices adjacent in the circumferential direction are the same and the directions of rotation of the vortices adjacent in the radial direction are opposite.

7. A combustion apparatus as recited in claim 5 in which the directions of rotation of the vortices adjacent in the radial direction are the same and the directions of rotation of the vortices adjacent in the circumferential direction are opposite.

8. A combustion apparatus comprising an air duct, a generally annular combustion chamber therein having an axis and comprising outer and inner air inlets, the outer air inlets being in a circumferential array and the inner air inlets each corresponding to an outer inlet disposed radially outwardly thereof, a cone skewed at a substantial circumferential angle to the said axis extending from each inlet defining in succession from the inlet a mixing zone and a combustion zone, and a swirler in each inlet admitting primary air to the combustion chamber and producing a vortex flow in the cone, the swirlers of the outer cones rotating the air oppositely to those of the inner cones, means for injecting fuel into the mixing zone, the cones merging the preliminary combustion zone of each cone into a zone of more advanced combustion of the adjacent cone on one side and merging the zone of more advanced combustion of each cone into the preliminary combustion zone of the adjacent cone on the other side.

9. A combustion apparatus as recited in claim 8 including annular outer and inner walls defining a dilution zone and having openings for admission of dilution air from the duct, and in which the cones discharge into the dilution zone.

10. A combustion apparatus comprising an air duct, a generally annular combustion chamber having an axis and having annular outer and inner walls defining a main combustion zone and dilution zone downstream of said main combustion zone which provides for completion of combustion, the combustion chamber comprising air inlets disposed at an end thereof in a circumferential array around the axis, a cone skewed at a substantial circumferential angle to the said axis extending from each inlet into the main combustion zone, each cone defining in succession from the inlet a mixing zone and a preliminary combustion zone, a swirler in each inlet admitting air to the combustion chamber through the cone and producing a vortex flow in the cone, and means for injecting fuel into each mixing zone, the cones merging and opening the preliminary combustion zone of each cone into a zone of more advanced combustion developed by an adjacent cone, the walls of the dilution zone having openings for admission of dilution air from the duct.

References Cited in the file of this patent

UNITED STATES PATENTS

| | | |
|---|---|---|
| 2,326,072 | Seippel | Aug. 3, 1943 |
| 2,560,223 | Hanzalek | July 10, 1951 |
| 2,577,918 | Rowe | Dec. 11, 1951 |
| 2,687,010 | Ellis | Aug. 24, 1954 |
| 2,768,497 | Hayes | Oct. 30, 1956 |
| 2,797,549 | Probert et al. | July 2, 1957 |